United States Patent [19]
Bogdan et al.

[11] Patent Number: 6,086,788
[45] Date of Patent: Jul. 11, 2000

[54] HYDROFLUOROCARBON BLOWN FOAM AND METHOD FOR PREPARATION THEREOF

[75] Inventors: Mary Charlotte Bogdan; Leslie Bruce Bement; Barbara Ruth Decaire; Dennis Paul Konopa; Harold John Kieta; Rajiv Ratna Singh, all of Erie County, N.Y.

[73] Assignee: AlliedSignal Inc., Morristown, N.J.

[21] Appl. No.: 09/268,001

[22] Filed: Mar. 15, 1999

[51] Int. Cl.[7] .................................. C08K 3/00; C08J 9/14
[52] U.S. Cl. ........................... 252/350; 521/117; 521/131
[58] Field of Search ............................ 252/350; 521/117, 521/131

[56] References Cited

U.S. PATENT DOCUMENTS

| | | |
|---|---|---|
| 3,183,192 | 5/1965 | Bauer et al. . |
| 3,352,789 | 11/1967 | Degginger et al. . |
| 4,581,384 | 4/1986 | Marlon et al. . |
| 4,624,970 | 11/1986 | Dwyer et al. . |
| 4,760,099 | 7/1988 | Canaday et al. . |
| 4,795,763 | 1/1989 | Gluck et al. . |
| 5,496,866 | 3/1996 | Sommerfeld et al. . |
| 5,516,811 | 5/1996 | Bartlett et al. . |
| 5,532,284 | 7/1996 | Bartlett et al. . |

OTHER PUBLICATIONS

M. Bogdan, D. Orlowski, J. Bennington, J. Welch, A Method for the Determination of Cell Gas Content in Polyurethane Foams, Polyurethane 1995, Sep. 26–29, 1995, pp. 24–37.

J.E. Christian, G.E. Courville, R.L. Linkous, R.L. Wendt, T. Smith, R. S Graves, The Technical Viability of Alternative Blowing Agents in Polyisocyanurate Roof Insulation 33rd Annual Polyurethane Technical/Marketing Conference, Sep. 30, 1990–Oct. 3, 1990 pp. 247–258.

*Primary Examiner*—Morton Foelak
*Attorney, Agent, or Firm*—Jay P. Friedenson; Marie Collazo

[57] ABSTRACT

The invention relates to the addition of α-methyl styrene, isobutanol and/or isopropanol to reduce vapor pressure, improve k-factor, enhance the solubility of the blowing agent in the premix and/or improve the processing characteristics of polyurethane and polyisocyanurate closed-cell foams prepared with a blowing agent comprising a hydrofluorocarbon selected from the group consisting of 1,1,1,3,3-pentafluoropropane, 1,1,1,2-tetrafluoroethane, 1,1,2,2-tetrafluoroethane, and mixtures thereof.

7 Claims, No Drawings

HYDROFLUOROCARBON BLOWN FOAM AND METHOD FOR PREPARATION THEREOF

FIELD OF THE INVENTION

The invention relates to polyurethane and polyisocyanurate closed-cell foams. More particularly, the invention relates to the addition of α-methyl styrene, isobutanol and/or isopropanol to reduce vapor pressure, improve k-factor, enhance the solubility of the blowing agent in the premix and/or improve the processing characteristics of polyurethane and polyisocyanurate closed-cell foams prepared with a blowing agent comprising a hydrofluorocarbon selected from the group consisting of 1,1,1,3,3-pentafluoropropane (HFC-245fa), 1,1,1,2-tetrafluoroethane (HFC- 134a), 1,1,2, 2-tetrafluoroethane (HFC-134) and mixtures thereof.

BACKGROUND OF THE INVENTION

The class of foams known as low density rigid polyurethane or polyisocyanurate foam has utility in a wide variety of insulation applications including roofing systems, building panels, refrigerators and freezers. The methods of producing polyurethane and polyisocyanurate foams are generally known and consist in general of the reaction of an organic polyisocyanate and a polyol or mixture of polyols in the presence of a volatile blowing agent, which is caused to vaporize by the heat liberated during the reaction of isocyanate or isocyanurate and polyol. This reaction can be enhanced through the use of amine and/or other catalysts as well as surfactants. The catalysts ensure adequate curing of the foam, while the surfactants regulate and control cell size.

The foam industry has historically used liquid fluorocarbon blowing agents such as trichlorofluoromethane (CFC-11) and 1,1-dichloro-1-fluoroethane (HCFC-141b.) because of their ease of use in processing conditions. Fluorocarbons act not only as blowing agents by virtue of their volatility, but also are encapsulated or entrained in the closed cell structure of the rigid foam and are the major contributor to the low thermal conductivity properties of rigid urethane foams. The escape of certain fluorocarbons, most notably chlorofluorocarbons, to the atmosphere is now recognized as potentially contributing to the depletion of the stratospheric ozone layer and to global warming. In view of the environmental concerns with respect to chlorofluorocarbon blowing agents, it is now generally accepted that it would be more desirable to use hydrochlorofluorocarbons (HCFCs) or hydrofluorocarbons (HFCs) rather than the chlorofluorocarbons. Exemplary hydrofluorocarbons suitable for use as blowing agents in the preparation of polyurethane and polyisocyanurate foams are 1,1,1,3,3-pentafluoropropane, 1,1,1,2-tetrafluoroethane and 1,2,2,-tetrafluoroethane (known in the art as HFC-245fa, HFC-134a, and HFC-134, respectively). These materials, however, possess a lower boiling point and a correspondingly higher vapor pressure than the prior art materials. This difference becomes significant when any of HFC-245fa, HFC-134a or HFC-134 are incorporated into the B-side of a foam formulation that is either transported in or used directly from a low pressure rated container.

The use of a fluorocarbon as the preferred commercial expansion or blowing agent in insulating foam applications is based in part on the resulting k-factor associated with the foam produced. K-factor is defined as the rate of transfer of heat energy by conduction through one square foot of one inch thick homogenous material in one hour where there is a difference of one degree Fahrenheit perpendicularly across the two surfaces of the material. As is generally known in the art, the cell gas composition of the foam at the moment of manufacture does not necessarily correspond to the equilibrium gas composition after aging or sustained use. The gas in a closed cell foam frequently exhibits compositional changes as the foam ages leading to such known phenomena as increase in thermal conductivity or loss of insulation value (both measured in terms of k-factor) and thermal aging. Since the utility of closed-cell polyurethane-type foams is based, in part, upon their thermal insulation properties, it would be advantageous to identify materials which lower the k-factor of foams and reduce thermal aging of the foams over time.

Methods for improving the k-factor and/or thermal aging characteristics of polyurethane foam are disclosed in U.S. Pat. Nos. 5,696,306 and 5,837,742. There remains a need In the art for polyurethane and polyisocyanurate foams prepared from a blowing agent comprising a hydrofluorocarbon selected from the group consisting of HFC-245fa, HFC-134a, HFC-134 and mixtures thereof, which foams have improved processibility, k-factor and/or thermal aging characteristics. The instant invention meets this need by providing additives that reduce the vapor pressure of HFC-245fa and HFC-134a and/or reduce the k-factor of foams produced from blowing agents comprising these hydrofluorocarbons.

DETAILED DESCRIPTION OF THE INVENTION

It has now been discovered that the addition of one or more of α-methyl styrene, isobutanol and isopropanol to the B-side of a polyurethane or polyisocyanuate foam formulation comprising a blowing agent comprising a hydrofluorocarbon selected from the group consisting of 1,1,1,3,3-pentafluoropropane, 1,1,1,2-tetrafluoroethane, 1,1,2,2-tetrafluoroethane and mixtures thereof results in reduced vapor pressure, improved k-factor, enhanced solubility of the blowing agent and/or improved processing characteristics of the foams. The addition of α-methyl styrene to the foam formulation results in improved thermal conductivity (k-factor) and thermal aging characteristics. With respect to thermal conductivity, the term "improved" refers to a decrease in the k-factor of the foam.

Accordingly, the invention relates to a method of preparing polyurethane and polyisocyanurate foam compositions comprising the step of reacting and foaming a mixture of ingredients which react to form polyurethane or polyisocyanurate foams in the presence of a blowing agent a blowing agent comprising a hydrofluorocarbon selected from the group consisting of 1,1,1,3,3-pentafluoropropane, 1,1,1,2-tetrafluoroethane, 1,1,2,2-tetrafluoroethane and mixtures thereof and an effective amount of an additive selected from the group consisting of α-methyl styrene, isobutanol, isopropanol and mixtures thereof, preferably from about 0.02 to about 10 weight percent of said additive, based on the amount of blowing agent. In another embodiment, the invention provides a method of preparing polyurethane and polyisocyanurate foam compositions comprising the step of reacting and foaming a mixture of ingredients which react to form polyurethane or polyisocyanurate foams in the presence of a blowing agent a blowing agent comprising 1,1,1, 3,3-pentafluoropropane and (α-methyl styrene, preferably from about 0.02 to about 5 weight percent α-methyl styrene, based on the amount of blowing agent.

The invention further relates to a closed cell foam prepared from a polymer foam formulation containing a blowing agent a hydrofluorocarbon selected from the group consisting of 1,1,1,3,3-pentafluoropropane, 1,1,1,2-tetrafluoroethane, 1,1,2,2-tetrafluoroethane and mixtures thereof and an effective amount of an additive selected from the group consisting of (α-methyl styrene, isobutanol, isopropanol and mixtures thereof, preferably from about 0.02 to about 10 weight percent of said additive, based on the amount of blowing agent. In one embodiment, the invention provides a closed cell foam prepared from a polymer foam formulation containing a blowing agent comprising 1,1,1,3, 3-pentafluoropropane and α-methyl styrene, preferably from about 0.02 to about 5 weight percent α-methyl styrene, based on the amount of blowing agent.

In another embodiment, the invention provides a closed cell foam containing a cell gas comprising a blowing agent comprising a hydrofluorocarbon selected from the group consisting of 1,1,1,3,3-pentafluoropropane, 1,1,1,2-tetrafluoroethane, 1,1,2,2-tetrafluoroethane and mixtures thereof and an additive selected from the group consisting of α-methyl styrene, isobutanol, isopropanol and mixtures thereof, preferably from about 0.02 to about 10 weight percent of said additive, based on the amount of blowing agent. In one embodiment, the invention provides a closed cell foam containing a cell gas comprising a blowing agent comprising 1,1,1,3,3-pentafluoropropane and α-methyl styrene, preferably from about 0.02 to about 5 weight percent α-methyl styrene, based on the amount of blowing agent.

The invention further relates to a blowing agent composition comprising a hydrofluorocarbon selected from the group consisting of 1,1,1,3,3-pentafluoropropane, 1,1,1,2-tetrafluoroethane, 1,1,2,2-tetrafluoroethane and mixtures thereof and an additive selected from the group consisting of α-methyl styrene, isobutanol, isopropanol and mixtures thereof, preferably from about 0.02 to about 10 weight percent of said additive, based on the amount of blowing agent. In one embodiment, the invention provides a blowing agent composition 1,1,1,3,3-pentafluoropropane and α-methyl styrene, preferably from about 0.02 to about 5 weight percent α-methyl styrene, based on the amount of blowing agent.

As used herein, an effective amount of additive means an amount, based on the amount of blowing agent, which reduces the vapor pressure of a foam formulation B-side to below the vapor pressure of the corresponding foam prepared in the absence of additive. Generally, an effective amount is from about 0.02 to about 10 weight percent, based on the amount of blowing agent. The α-methyl styrene is preferably added in an amount of from about 0.5 to about 2 weight percent, based on the amount of blowing agent.

As used herein, blowing agent composition refers HFC-245fa or HFC-134a singly or in combination with other non-ozone depleting blowing agents, such as, for example, other hydrofluorocarbons, e.g., difluoromethane (HFC-32), difluoroethane (HFC-152), trifluoroethane (HFC-143), tetrafluoroethane (HFC-134), pentafluoropropane (HFC-245), hexafluoropropane (HFC-236), heptafluoropropane (HFC-227); $C_4$–$C_7$ hydrocarbons, including but not limited to butane, isobutane, n-pentane, isopentane, cyclopentane, hexane and isohexane; inert gases, e.g., air, nitrogen, carbon dioxide; and water in an amount of from about 0.5 to about 2 parts per 100 parts of polyol. Where isomerism is possible for the hydrofluorocarbons mentioned above, the respective isomers may be used either singly or in the form of a mixture.

HFC-245fa is a known material and can be prepared by methods known in the art such as those disclosed in WO 94/14736, WO 94/29251, WO 94/29252 and U.S. Pat. No. 5,574,192. Difluoroethane, trifluoroethane, tetrafluoroethane, heptafluoropropane and hexafluoropropane are available for purchase from AlliedSignal Inc. of Morristown, N.J. The α-methyl styrene, isobutanol and isopropanol components of the invention are also commercially available.

With respect to the preparation of rigid or flexible polyurethane or polyisocyanurate foams using a blowing agent comprising 1,1,1,3,3-pentafluoropropane or 1,1,1,2-tetrafluoroethane, any of the methods well known in the art can be employed. See Saunders and Frisch, Volumes I and II Polyurethanes Chemistry and Technology (1962). In general, polyurethane or polyisocyanurate foams are prepared by combining under suitable conditions an isocyanate (or isocyanurate), a polyol or mixture of polyols, a blowing agent or mixture of blowing agents, and other materials such as catalysts, surfactants, and optionally, flame retardants, colorants, or other additives.

It is convenient in many applications to provide the components for polyurethane or polyisocyanurate foams in pre-blended foam formulations. Most typically, the foam formulation is pre-blended into two components. The isocyanate or polyisocyanate composition comprises the first component, commonly referred to as the "A" component or "A-side." The polyol or polyol mixture, surfactant, catalysts, blowing agents, flame retardant, water and other isocyanate reactive components comprise the second component, commonly referred to as the "B" component or "B-side". While the surfactant and fluorocarbon blowing agent are usually placed on the polyol side, they may be placed on either side, or partly on one side and partly on the other side. Accordingly, polyurethane or polyisocyanurate foams are readily prepared by bringing together the A and B side components either by hand mix, for small preparations, or preferably machine mix techniques to form blocks slabs, laminates, pour-in-place panels and other items, spray applied foams, froths, and the like. Optionally, other ingredients such as fire retardants, colorants, auxiliary blowing agents, water and even other polyols can be added as a third stream to the mix head or reaction site. Most conveniently, however, they are all incorporated into one B component.

The α-methylstyrene, isobutanol and isopropanol additives of the present invention may be added to B-side of the foam formulation, or to the blowing agent per se, by any manner well known in the art.

Any organic polyisocyanate can be employed in polyurethane or polyisocyanurate foam synthesis inclusive of aliphatic and aromatic polyisocyanates. Preferred as a class are the aromatic polyisocyanates. Preferred polyisocyanates for rigid polyurethane or polyisocyanurate foam synthesis are the polymethylene polyphenyl isocyanates, particularly the mixtures containing from about 30 to about 85 percent by weight of methylenebis(phenyl isocyanate) with the remainder of the mixture comprising the polymethylene polyphenyl polyisocyanates of functionality higher than 2. Preferred polyisocyanates for flexible polyurethane foam synthesis are toluene diisocyanates including, without limitation, 2,4-toluene diisocyanate, 2,6-toluene diisocyanate, and mixtures thereof.

Typical polyols used in the manufacture of rigid polyurethane foams include, but are not limited to, aromatic amino-based polyether polyols such as those based on mixtures of 2,4- and 2,6-toluenediamine condensed with ethylene oxide and/or propylene oxide. These polyols find utility in pour-in-place molded foams. Another example is aromatic alkylamino-based polyether polyols such as those based on ethoxylated and/or propoxylated aminoethylated nonylphenol derivatives. These polyols generally find utility in spray applied polyurethane foams. Another example is sucrose-based polyols such as those based on sucrose derivatives and/or mixtures of sucrose and glycerine derivatives condensed with ethylene oxide and/or propylene oxide. These polyols generally find utility in pour-in-place molded foams.

Typical polyols used in the manufacture of flexible polyurethane foams include, but are not limited to, those based on glycerol, ethylene glycol, trimethylolpropane, ethylene diamine, pentaerythritol, and the like condensed with ethylene oxide, propylene oxide, butylene oxide, and the like. These are generally referred to as "polyether polyols". Another example is the graft copolymer polyols which include, but are not limited to, conventional polyether polyols with vinyl polymer grafted to the polyether polyol chain. Yet another example is polyurea modified polyols which consist of conventional polyether polyols with polyurea particles dispersed in the polyol.

Examples of polyols used in polyurethane modified polyisocyanurate foams include, but are not limited to, aromatic polyester polyols such as those based on complex mixtures of phthalate-type or terephthalate-type esters formed from polyols such as ethylene glycol, diethylene glycol, or propylene glycol. These polyols are used in rigid laminated boardstock, and may be blended with other types of polyols such as sucrose based polyols, and used in polyurethane foam applications.

Catalysts used in the manufacture of polyurethane foams are typically tertiary amines including, but not limited to, N-alkylmorpholines, N-alkylalkanolamines, N,N-dialkylcyclohexylamines, and alkylamines where the alkyl groups are methyl, ethyl, propyl, butyl and the like and isomeric forms thereof, as well as heterocyclic amines. Typical, but not limiting, examples are triethylenediamine, tetramethylethylenediamine, bis(2-dimethylaminoethyl) ether, triethylamine, tripropylamine, tributylamine, triamylamine, pyridine, quinoline, dimethylpiperazine, piperazine, N,N-dimethylcyclohexylamine, N-ethylmorpholine, 2-methylpiperazine, N,N-dimethylethanolamine, tetramethylpropanediamine, methyltriethylenediamine, and mixtures thereof.

Optionally, non-amine polyurethane catalysts are used. Typical of such catalysts are organometallic compounds of lead, tin, titanium, antimony, cobalt, aluminum, mercury, zinc, nickel, copper, manganese, zirconium, and mixtures thereof Exemplary catalysts include, without limitation, lead 2-ethylhexoate, lead benzoate, ferric chloride, antimony trichloride, and antimony glycolate. A preferred organo-tin class includes the stannous salts of carboxylic acids such as stannous octoate, stannous 2-ethylhexoate, stannous laurate, and the like, as well as dialkyl tin salts of carboxylic acids such as dibutyl tin diacetate, dibutyl tin dilaurate, dioctyl tin diacetate, and the like.

In the preparation of polyisocyanurate foams, trimerization catalysts are used for the purpose of converting the blends in conjunction with excess A component to polyisocyanurate-polyurethane foams. The trimerization catalysts employed can be any catalyst known to one skilled in the art including, but not limited to, glycine salts and tertiary amine trimerization catalysts, alkali metal carboxylic acid salts, and mixtures thereof Preferred species within the classes are potassium acetate, potassium octoate, and N-(2-hydroxy-5-nonylphenol)methyl-N-methylglycinate.

Also included in the mixture are blowing agents or blowing agent blends. Generally speaking, the amount of blowing agent present in the blended mixture is dictated by the desired foam densities of the final polyurethane or polyisocyanurate foams products. The polyurethane foams produced can vary in density, for example, from about 0.5 pound per cubic foot to about 40 pounds per cubic foot, preferably from about 1 to about 20 pounds per cubic foot, and most preferably from about 1 to about 6 pounds per cubic foot. The density obtained is a function of how much of the blowing agent, or blowing agent mixture, is present in the A and/or B components, or that is added at the time the foam is prepared. The proportions in parts by weight of the total blowing agent or blowing agent blend can fall within the range of from 1 to about 60 parts of blowing agent per 100 parts of polyol. Preferably from about 10 to about 35 parts by weight of blowing agent per 100 parts by weight of polyol are used.

Dispersing agents, cell stabilizers, and surfactants may be incorporated into the blowing agent mixture. Surfactants, better known as silicone oils, are added to serve as cell stabilizers. Some representative materials are sold under the names of DC-193, B-8404, and L-5340 which are, generally, polysiloxane polyoxyalkylene block co-polymers such as those disclosed in U.S. Pat. Nos. 2,834,748, 2,917,480, and 2,846,458.

Other optional additives for the blowing agent mixture may include flame retardants such as tris(2-chloroethyl) phosphate, tris(2-chloropropyl)phosphate, tris(2,3-dibromopropyl)phosphate, tris(1,3-dichloropropyl) phosphate, diammonium phosphate, various halogenated aromatic compounds, antimony oxide, aluminum trihydrate, polyvinyl chloride, and the like.

This invention is further illustrated by the following non-limiting examples in which parts or percentages are by weight unless otherwise specified.

EXAMPLE 1

In this example, the vapor pressure of a B-side prepared with HFC-245fa as a blowing agent is compared to a B-side prepared with HFC-245fa and 8.69% (3.0 pbw) isobutanol, based on the amount of HFC-245fa. The lowering of the vapor pressure was measured in an differential vapor pressure apparatus. The apparatus consists of two Fisher-Porter tubes with valves hooked to the two inlets of a differential pressure gauge (range –5 psi to +5 psi, with a resolution of 0.1 psi); together with a bypass line. To start the experiment, 50 grams of one of the two mixtures detailed in Table 1 were loaded in one of the two Fisher-Porter tube and 50 grams of the other mixture in the other tube. The apparatus was then evacuated to purge the system of air that can interfere with the pressure measurement. The bypass line was then opened to zero the differential pressure gauge. With the gauge at zero, the bypass valve is closed, and the two valves on the Fisher -Porter tube is opened to the differential pressure gauge for measurement. The differential pressure gauge showed that the isobutanol containing composition was lower in pressure by 1.9 psi compared to the composition that did not contain isobutanol (see Table 2).

TABLE 1

| Components | Wt. % | Wt. % |
| --- | --- | --- |
| Thanol R-470X[a] | 45.35 | 44.46 |
| Terate 203[b] | 13.39 | 13.13 |
| SF-265[a] | 5.13 | 5.03 |
| Glycerine | 3.06 | 3.00 |
| LK-443[c] | 0.67 | 0.66 |
| R-8020 | 1.20 | 1.18 |
| Lead Nap-all 24%[d] | 0.07 | 0.07 |
| Fyrol PCFC[e] | 8.03 | 7.87 |
| HFC-245fa | 23.09 | 22.64 |
| Isobutanol | 0.00 | 1.97 |
| Index | 110 | 110 |

[a]Polyol from Eastman Chemical
[b]Polyol from Hoescht Celanese
[c]Surfactant from Air products
[d]Catalyst from Mooney
[e]Additive from AKZO

TABLE 2

| Test | |
| --- | --- |
| Isobutanol concentration (wt % of blowing agent) | 8.60 |
| Change in vapor pressure (psig) | –1.9 |

EXAMPLE 2

In this example, the vapor pressure of the B-side prepared with HFC-245fa as a blowing agent is determined by the procedure described in Example 1 and is 10 compared to a B-side prepared with HFC-245fa and 8.60% isopropanol, based on the amount of HFC-245fa. The formulation used to prepare the foams is summarized in Table 3. Table 4 shows that the addition of isopropanol results in a decrease in vapor pressure of 2.28 psig.

TABLE 3

| Components | Wt. % | Wt. % |
|---|---|---|
| Thanol R-470X[f] | 45.20 | 44.23 |
| Terate 203[g] | 13.35 | 13.06 |
| SF-265[f] | 5.11 | 5.00 |
| Glycerine | 3.05 | 2.98 |
| LK-443[h] | 0.67 | 0.65 |
| R-8020 | 1.20 | 1.17 |
| Lead Nap-all 24%[i] | 0.07 | 0.07 |
| Fyrol PCF[j] | 8.01 | 7.83 |
| HFC-245fa | 23.35 | 22.85 |
| Isopropanol | 0.00 | 2.15 |
| Index | 110 | 110 |

[f]Polyol from Eastman Chemical
[g]Polyol from Hoescht Celanese
[h]Surfactant from Air products
[i]Catalyst from Mooney
[j]Additive from AKZO

TABLE 4

| Test | |
|---|---|
| Isopropanol concentration (wt % of blowing agent) | 8.69 |
| Change in vapor pressure (psig) | −2.28 |

EXAMPLE 3

In this example, the vapor pressure of a B-side prepared with HFC-245fa as a blowing agent is determined by the procedure described in Example 1 and is compared to the vapor pressure of B-sides prepared with HFC-245fa and 2.0% (0.64 pbw) and 0.5% (0.16 pbw) α-methyl styrene, based on the amount of HFC-245fa. These foams are prepared from commercial rigid polyurethane-type foam systems, contain an equal number of moles of blowing agent and have equivalent densities. The formulation used to prepare the foams is summarized in Table 5. Table 6 shows that the addition of α-methyl styrene in the amounts of 2.0 and 0.5 weight percent results in a decrease in vapor pressure of 1.2 and 0.7 psig, respectively.

TABLE 5

| Formulation | Wt. % | Wt. % | Wt. % |
|---|---|---|---|
| PHT4 DIOL[a] | 34.56 | 34.41 | 34.53 |
| THANOL® R-575[b] | 34.56 | 34.41 | 34.53 |
| DC-193[c] | 1.04 | 1.03 | 1.04 |
| POLYCAT 8[d] | 1.24 | 1.24 | 1.24 |
| N-95[e] | 6.91 | 6.88 | 6.91 |
| % α-methyl styrene | 0.00 | 0.44 | 0.11 |
| HFC-245fa | 21.68 | 21.58 | 21.65 |

[a]Polyol from Great Lakes Chemical
[b]Polyol from Eastman Chemical
[c]Surfactant (silicon glycol co-polymer) from Air Products and Chemicals
[d]Amine Catalyst from Air Products
[e]Non-Ionic Surface Active Agent from Texaco Chemical Co.

TABLE 6

| Test | | |
|---|---|---|
| α-methylstyrene concentration (wt % of blowing agent) | 2.0 | 0.5 |
| Change in vapor pressure (psig) | −1.2 | −0.7 |

EXAMPLE 4

In this example, the k-factor of a foam prepared with HFC-245fa as a blowing agent is compared to a foam prepared with HFC-245fa and 0.02% α-methyl styrene, based on the amount of HFC-245fa. These foams are prepared from commercial rigid polyurethane-type foam systems, contain an equal number of moles of blowing agent and have equivalent densities. The comparison is performed by measuring the k-factor of the foams by ASTM C-518 initially, at 13 days and at 26 days. The formulation used to prepare the foams is summarized in Table 7. The test results summarized Table 8 indicate that foams prepared with HFC-245fa and α-methyl styrene have better (lower) k-factors than foams prepared with HFC-245fa alone.

TABLE 7

| Components | Wt. % | Wt. % |
|---|---|---|
| Thanol R-470X[k] | 45.05 | 45.05 |
| Terate 203[l] | 13.30 | 13.30 |
| SF-265[a] | 5.09 | 5.09 |
| Glycerine | 3.04 | 3.04 |
| LK-443[m] | 0.66 | 0.66 |
| R-8020 | 1.20 | 1.20 |
| Lead Nap-all 24%[n] | 0.07 | 0.07 |
| Fyrol PCF[o] | 7.98 | 7.98 |
| Water | 0.33 | 0.33 |
| HFC-245fa | 23.27 | 23.27 |
| α-methyl styrene | 0.00 | 0.01 |
| Index | 110 | 110 |

[k]Polyol from Eastman Chemical
[l]Polyol from Hoescht Celanese
[m]Surfactant from Air products
[n]Catalyst from Mooney
[o]Additive from AKZO

TABLE 8

| Test | Time (days) | | |
|---|---|---|---|
| k-Factor (BTU in/Hr Ft$^2$ ° F.) | Initial | .150 | .146 |
| | 13 days | .165 | .160 |
| | 28 days | .172 | .167 |

EXAMPLE 5

In this example, the k-factor of a foam prepared with HFC-245fa as a blowing agent is compared to a foam prepared with 0.5% α-methyl styrene, based on the amount of HFC-245fa. These foams are prepared from commercial rigid polyurethane-type foam systems, contain an equal number of moles of blowing agent and have equivalent densities.

The comparison is performed by measuring the k-factor of the foams by ASTM C-518 initially, at 13 days and at 26 days. The formulation used to prepare the foams is summarized in Table 9. The test results summarized in Table 10 indicate that foams prepared from a different foam formulation containing HFC-245fa and 0.5% α-methyl styrene have better (lower) k-factors than foams prepared with HFC-245fa alone.

TABLE 9

| Components | PBW | PBW |
|---|---|---|
| Thanol R-470X[p] | 45.05 | 44.98 |
| Terate 203[q] | 13.30 | 13.28 |
| SF-265[r] | 5.09 | 5.09 |
| Glycerine | 3.04 | 3.03 |
| LK-443[r] | 1.20 | 1.19 |
| R-8020 | 0.07 | 0.07 |
| Lead Nap-all 24%[s] | 7.98 | 7.97 |
| Fyrol PCF[t] | 0.33 | 0.33 |
| Water | 0.33 | 0.33 |
| HFC-245fa | 23.27 | 23.24 |
| α-methyl styrene | 0.00 | 0.15 |
| Index | 110 | 110 |

[p]Polyol from Eastman Chemical
[q]Polyol from Hoescht Celanese
[r]Surfactant from Air products
[s]Catalyst from Mooney
[t]Additive from AKZO

TABLE 10

| Test | Time (days) | | |
|---|---|---|---|
| k-Factor (BTU in/Hr Ft² F) | Initial | .150 | .147 |
| | 13 days | .165 | .160 |
| | 28 days | .172 | .166 |

EXAMPLE 6

In this example, the k-factor of a foam prepared with HFC-245fa as a blowing agent is compared to a foam prepared with 2.0% α-methyl styrene, based on the amount of HFC-245fa. These foams are prepared from commercial rigid polyurethane-type foam systems, contain an equal number of moles of blowing agent and have equivalent densities.

The comparison is performed by measuring the k-factor of the foams by ASTM C-518 initially, at 13 days and at 26 days. The formulation used to prepare the foams is summarized in Table 11. The test results summarized in Table 8 indicate that foams prepared with HFC-245fa and 2.0% α-methyl styrene have better (lower) k-factors than foams prepared with HFC-245fa alone.

TABLE 11

| Components | Wt. % | Wt. % |
|---|---|---|
| Thanol R-470X[u] | 45.05 | 44.84 |
| Terate 203[v] | 13.30 | 13.24 |
| SF-265[k] | 5.09 | 5.07 |
| Glycerine | 3.04 | 3.02 |
| LK-443[w] | 1.20 | 1.19 |
| R-8020 | 0.66 | 0.66 |
| Lead Nap-all 24%[x] | 0.07 | 0.07 |
| Fyrol PCF[y] | 7.98 | 7.98 |
| water | 0.33 | 0.33 |
| HFC-245fa | 23.27 | 23.16 |

TABLE 11-continued

| Components | Wt. % | Wt. % |
|---|---|---|
| α-methyl styrene | 0.00 | 0.46 |
| Index | 110 | 110 |

[u]Polyol from Eastman Chemical
[v]Polyol from Hoescht Celanese
[w]Surfactant from Air products
[x]Catalyst from Mooney
[y]Additive from AKZO

TABLE 12

| Test | Time (days) | | |
|---|---|---|---|
| k-Factor (BTU in/Hr Ft² ° F.) | Initial | .150 | .148 |
| | 13 days | .165 | .162 |
| | 28 days | .172 | .162 |

EXAMPLE 7

In this example, a foam is prepared from a typical commercial rigid polyurethane-type foam formulation such as that shown in Table 13, wherein the moles of blowing agent are equal and the densities are equivalent. Foams prepared with HFC-134a as the blowing agent is compared to a foam with HFC-134a and 0.02% α-methyl styrene, based on the amount of HFC-134a. The vapor pressures of the B-sides of the respective foams are determined by the procedure described in Example 1 and are compared. The k-factor of the resultant foams are determined using ASTM C-518 and compared. Both the vapor pressure of the B-side and k-factor of the compositions containing α-methyl styrene display improvement.

TABLE 13

| Components | Wt. % | Wt. % |
|---|---|---|
| Thanol R-470X[z] | 67.76 | 45.05% |
| Terate 203[aa] | 20.01 | 13.30% |
| SF-265[a] | 7.66 | 5.09% |
| Glycerin | 4.57 | 3.04% |
| LK-443[bb] | 1 | 0.66% |
| R-8020 | 1.8 | 1.20% |
| Lead Nap-all 24%[cc] | 0.1 | 0.07% |
| Fyrol PCF[dd] | 12 | 7.98% |
| Water | 0.5 | 0.33% |
| HFC-245fa | 35 | 23.27% |
| α-methyl styrene | 0 | 0.01% |
| Index | 110 | 110 |

[z]Polyol from Eastman Chemical
[aa]Polyol from Hoescht Celanese
[bb]Surfactant from Air products
[cc]Catalyst from Mooney
[dd]Additive from AKZO

What is claimed is:

1. A blowing agent composition comprising a hydrofluorocarbon selected from the group consisting of 1,1,1,3,3-pentafluoropropane, 1,1,1,2-tetrafluoroethane, 1,1,2,2-tetrafluoroethane, and mixtures thereof, and an effective amount of an additive selected from the group consisting of α-methyl styrene, isobutanol, isopropanol and mixtures thereof.

2. The blowing agent composition of claim 1 wherein the additive is present in the amount of from about 0.02 to about 10 weight percent, based on the amount of blowing agent.

3. The blowing agent composition of claim 1 wherein the additive is α-methyl styrene.

4. The blowing agent composition of claim 3 wherein the α-methyl styrene is present in the amount of from about 0.02 to about 5 weight percent, based on the amount of blowing agent.

5. The blowing agent composition of claim 1 comprising 1,1,1,3,3-pentafluoropropane and an effective amount of α-methyl styrene.

6. The blowing agent composition of claim 5 wherein the α-methyl styrene is present in the amount of from about 0.02 to about 5 weight percent, based on the amount of blowing agent.

7. The blowing agent composition of claim 5 wherein the α-methyl styrene is present in the amount of from about 0.02 to about 2 weight percent, based on the amount of blowing agent.

* * * * *